United States Patent
Lee (10) Patent No.: US 12,491,276 B2
(45) Date of Patent: Dec. 9, 2025

(54) STERILIZATION APPARATUS FOR VEHICLE

(71) Applicants: Hyundai Motor Company, Seoul (KR); Kia Corporation, Seoul (KR)

(72) Inventor: Jae Seung Lee, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 458 days.

(21) Appl. No.: 18/079,508

(22) Filed: Dec. 12, 2022

(65) Prior Publication Data

US 2023/0293744 A1    Sep. 21, 2023

(30) Foreign Application Priority Data

Mar. 15, 2022  (KR) .......................... 10-2022-0031739

(51) Int. Cl.
*A61L 2/10* (2006.01)
*A61L 2/24* (2006.01)

(52) U.S. Cl.
CPC ..................... *A61L 2/10* (2013.01); *A61L 2/24* (2013.01); *A61L 2202/11* (2013.01); *A61L 2202/14* (2013.01); *A61L 2202/26* (2013.01)

(58) Field of Classification Search
CPC .......... A61L 2/10; A61L 2/24; A61L 2202/11; A61L 2202/14; A61L 2202/16; A61L 2202/25; A61L 2202/26
See application file for complete search history.

(56) References Cited

U.S. PATENT DOCUMENTS

| | | |
|---|---|---|
| 2012/0313014 A1 | 12/2012 | Stibich et al. |
| 2018/0064833 A1* | 3/2018 | Childress ............... B64D 11/02 |
| 2020/0306398 A1 | 10/2020 | Ruiter et al. |
| 2022/0062466 A1* | 3/2022 | Lee ........................... A61L 2/10 |

FOREIGN PATENT DOCUMENTS

| | | |
|---|---|---|
| JP | 2006-341759 A | 12/2006 |
| JP | 2012-254673 A | 12/2012 |
| KR | 10-2045226 B | 11/2019 |
| KR | 2020-0012576 A | 2/2020 |
| KR | 2021-0121434 A | 10/2021 |

\* cited by examiner

*Primary Examiner* — Dirk R Bass
(74) *Attorney, Agent, or Firm* — Morgan Lewis & Bockius LLP

(57) ABSTRACT

A sterilization apparatus for a vehicle, includes a lift unit mounted in the vehicle to be selectively lifted and protruded; a sterilization unit connected to the lift unit, including an ultra violet light emitting diode (UV LED), and sterilizing a vehicle interior when necessary; and a control unit connected to the lift unit and the sterilization unit for controlling lifting of the lift unit when preset operation conditions are satisfied.

13 Claims, 9 Drawing Sheets

STERILIZATION APPARATUS FOR VEHICLE

CROSS-REFERENCE TO RELATED APPLICATION

The present application claims priority to Korean Patent Application No. 10-2022-0031739 filed on Mar. 15, 2022, the entire contents of which is incorporated herein for all purposes by this reference.

BACKGROUND OF THE PRESENT DISCLOSURE

Field of the Present Disclosure

The present disclosure relates to a sterilization apparatus for a vehicle, and more particularly, to a sterilization apparatus for a vehicle, performing ultra violet (UV) sterilization of an entire vehicle interior by facilitating an ultra violet light emitting diode (UV LED) module to be selectively lifted and rotated when applied to a headrest included in a vehicle sheet.

Description of Related Art

In general, to maintain an air environment of a vehicle interior in a comfortable or suitable condition for a driver, an air-conditioning device for a vehicle may have constant temperature and humidity functions to keep constant temperature and humidity of the vehicle as well as dehumidification and humidification, cleaning, ventilation, aroma functions and the like, in addition to cooling and heating functions corresponding to its main functions.

In the air-conditioning device for a vehicle, a cabin filter may play an important function to make air of the vehicle interior suitable because air is introduced into the vehicle through the cabin filter filtering out and purifying pollutants such as exhaust gas, dust, yellow dust or the like in air.

However, the cabin filter is usually positioned in a globe box in front of a passenger seat. Therefore, when checking and replacing the cabin filter, the glove box is required to be opened and separated, and then fitted to its original position, and also required to be mounted in line with a determined direction in which air flows, i.e., in a correct direction thereof. Accordingly, for the driver, it is not only very cumbersome to often replace the cabin filter, but also difficult to immediately check a state where the cabin filter is contaminated. As a result, it may take a long time and the work may not be easy.

Therefore, recently developed is a device suppressing bacteria and purifying air of the vehicle interior by applying a sterilization effect of ultra violet light emitting diode (UV LED) emitting ultra violet rays to air purification.

Interest in sterilization and disinfection is increasing due to continuous large-scale infectious diseases (e.g., SARS/New Flu/MERS/Corona 19), and there is an increasing demand for sterilizing even the vehicle interior necessary for everyday life.

However, a sterilization range may be limited when the sterilization of the entire vehicle interior is performed in the present way, i.e., by use of the UV LED while focusing on a portion in contact with a passenger's hand, such as the steering wheel, center fascia, seat or the like of the vehicle interior.

That is, a conventional sterilization apparatus applied to a vehicle may be individually provided and used in each device having active bacterial growth such as the steering wheel, an air conditioning duct or a smartphone holder, and thus may not perform sterilization of an entire internal space. The sterilization apparatus may be fixedly disposed to face each device, and thus inevitably have a lower sterilization performance on a device positioned outside its sterilization range.

To solve the present problem, more sterilization apparatuses than before may be used. However, more sterilization apparatuses may cause excessive additional costs and excessive sterilization time.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sterilization apparatus for a vehicle, which may have a maximized sterilization performance by use of the fewest ultra violet light emitting diode (UV LED) modules through an expansion of a sterilization range of each UV LED module. That is, the sterilization apparatus may sterilize an entire vehicle interior by determining whether a passenger is accommodated from a seat sensor configured for detecting whether a vehicle seat is occupied when the sterilization is requested, and then selectively adjusting an angle of the UV LED module by its lift and rotation for performing the sterilization, while the UV LED module is applied to a headrest of the seat.

According to an exemplary embodiment of the present disclosure, a sterilization apparatus for a vehicle may include: a lift unit mounted in the vehicle to be selectively lifted and protruded; a sterilization unit connected to the lift unit, including an ultra violet light emitting diode (UV LED), for sterilizing a vehicle interior when necessary; and a control unit connected to the lift unit and the sterilization unit for controlling lifting of the lift unit when preset operation conditions are satisfied.

The lift unit may include a case fixed inside the vehicle and including a lift guide therein, a lift block inserted into the case, wherein the lift guide is positioned in the lift block, and configured for being lifted from the inside of the case along the lift guide, and a driving member mounted on the lift block and engaged to the lift guide, and transmitting a driving force to the lift block so that the lift block is lifted from the inside of the case.

Furthermore, the lift unit may be mounted in a headrest included in a vehicle seat in the vehicle.

Furthermore, the lift unit may be mounted in an armrest in the vehicle to be selectively lifted therefrom.

Meanwhile, the sterilization unit may include a pair of connection members disposed upright and connected to the lift unit, a motor positioned on a rotation shaft connecting the connection members to each other along a horizontal direction, and transmitting a driving force for the rotation shaft to be rotated, and a sterilization module coupled to the rotation shaft, including the UV LED for sterilization and a heat sink dissipating heat generated from the UV LED, and including an angle adjusted by the rotation shaft which is selectively rotated by the motor as the lift unit is lifted.

Here, the sterilization unit may further include a cover member rotated with the sterilization module by the rotation shaft passing through an inside thereof, including an irradiation hole in which the UV LED is intensively irradiated, and including a housing area for accommodating the motor and the sterilization module therein.

Furthermore, the control unit may control an operation of the sterilization apparatus to be performed in an air sterilization mode in which a sterilization angle of the sterilization module is repeatedly adjusted to continuously face front, upper or rear side of the vehicle interior when the preset operation conditions are satisfied.

The preset operation conditions may be preset to conditions in which the vehicle is turned off, a vehicle door is locked, and no seat-occupation signal is received from a detection sensor positioned in a vehicle seat.

Meanwhile, the control unit may control an operation of the sterilization apparatus to be performed in a surface sterilization mode in which a sterilization angle of the sterilization unit is adjusted to face the front or rear side of the vehicle interior in a state where a position of a vehicle seat is fixed when all of the preset operation conditions are satisfied.

Furthermore, the control unit may control an operation of the sterilization apparatus to be performed in a surface sterilization mode in which lifting and sterilization angle of the sterilization unit are adjusted to face the front or rear surface of the vehicle interior in a state where a vehicle seat is moved forward when all of the preset operation conditions are satisfied.

Furthermore, the control unit may control an operation of the sterilization apparatus to be performed in a surface sterilization mode in which lifting and sterilization angle of the sterilization unit are adjusted to face the front or rear surface of the vehicle interior in a state where a vehicle seat is moved backward when all of the preset operation conditions are satisfied.

Furthermore, the control unit may control an operation of the sterilization apparatus to be performed in a surface sterilization mode in which lifting and sterilization angle of the sterilization unit are adjusted to face a front surface of the vehicle interior in a state where an angle and a position of a vehicle seat are rotated and moved forward, and lifting and sterilization angle of the sterilization unit are adjusted to face a rear surface of the vehicle interior in a state where the angle and the position of the vehicle seat are rotated and moved backward, when all of the preset operation conditions are satisfied.

Here, the control unit may control the operation of the sterilization apparatus to be performed in the surface sterilization mode by a request received by the control unit through a user terminal when all of the preset operation conditions are satisfied.

Furthermore, the control unit may control the operation of the sterilization apparatus to be automatically performed in the surface sterilization mode when all of the preset operation conditions are satisfied.

As set forth above, according to various exemplary embodiments of the present disclosure, the sterilization apparatus for a vehicle may sterilize the entire vehicle interior, while focusing on a portion in contact with a passenger's hand, such as the steering wheel, center fascia, seat or the like by determining whether the passenger is accommodated from the seat sensor configured for detecting whether the vehicle seat is occupied when the sterilization is requested by the user, and then selectively adjusting the angle of the UV LED module by its lift and rotation for performing the sterilization, while the UV LED module is applied to the headrest of the seat.

Furthermore, according to various exemplary embodiments of the present disclosure, the sterilization apparatus for a vehicle may have the maximized sterilization performance by use of the fewest ultra violet light emitting diode (UV LED) modules because the sterilization range of each UV LED module may be expanded by its elevation, rotation and adjusted angle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will now be described in detail with reference to accompanying drawings.

Advantages and features of the present disclosure and methods accomplishing the same may become apparent from the following description with reference to the accompanying drawings.

However, the present disclosure is not limited to the exemplary embodiments to be described below, and may be implemented in various different forms. These exemplary embodiments will be only provided to make the present disclosure complete and allow those skilled in the art to completely appreciate the scope of the present disclosure, and the present disclosure will be defined by the scope of the claims.

Furthermore, in describing the present disclosure, when it is decided that the well-known art related to the present disclosure may obscure the gist of the present disclosure, a detailed description thereof will be omitted.

Figure 1:
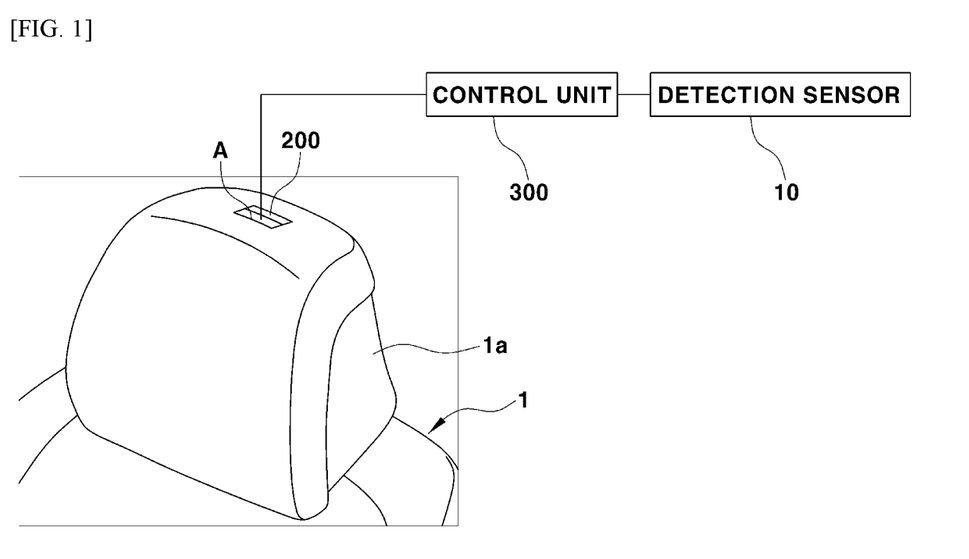
FIG. 1 is a view showing an application position of a sterilization apparatus for a vehicle according to an exemplary embodiment of the present disclosure.
Figure 2:
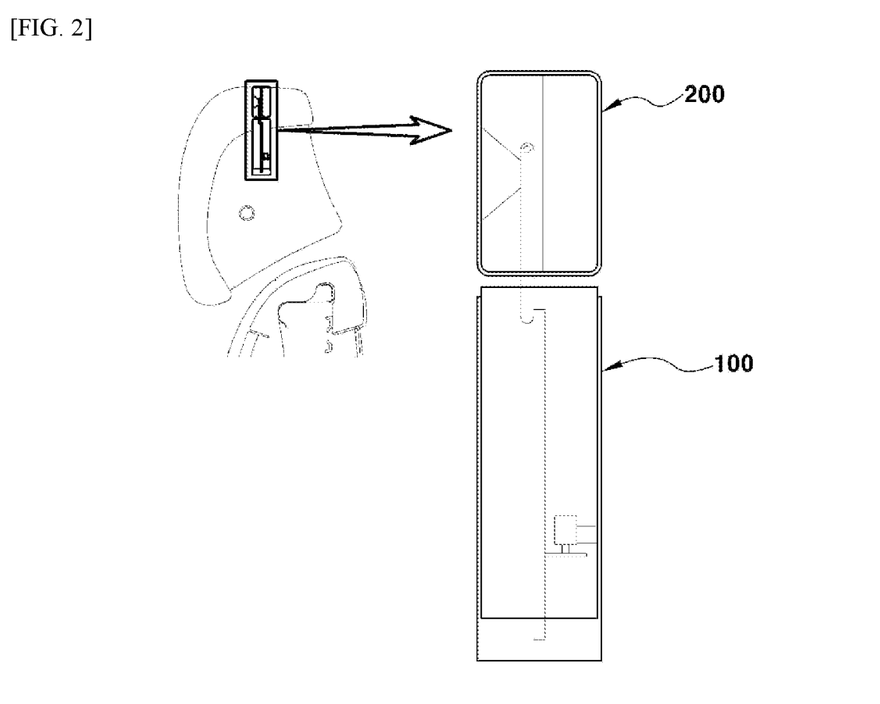
FIG. 2 is a view showing the lift unit and sterilization unit of the sterilization apparatus for a vehicle according to an exemplary embodiment of the present disclosure.

FIG. 1 is a view showing an application position of a sterilization apparatus for a vehicle according to an exemplary embodiment of the present disclosure, and FIG. 2 is a view showing the lift unit and sterilization unit of the sterilization apparatus for a vehicle according to an exemplary embodiment of the present disclosure.

Figure 3:
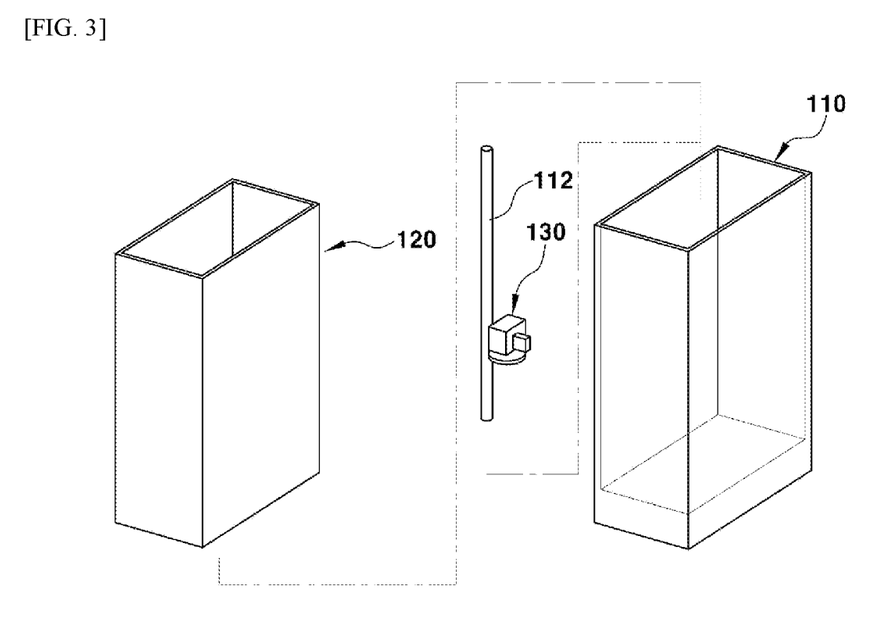
FIG. 3 is a view showing a configuration of the lift unit of the sterilization apparatus for a vehicle according to an exemplary embodiment of the present disclosure.
Figure 4:
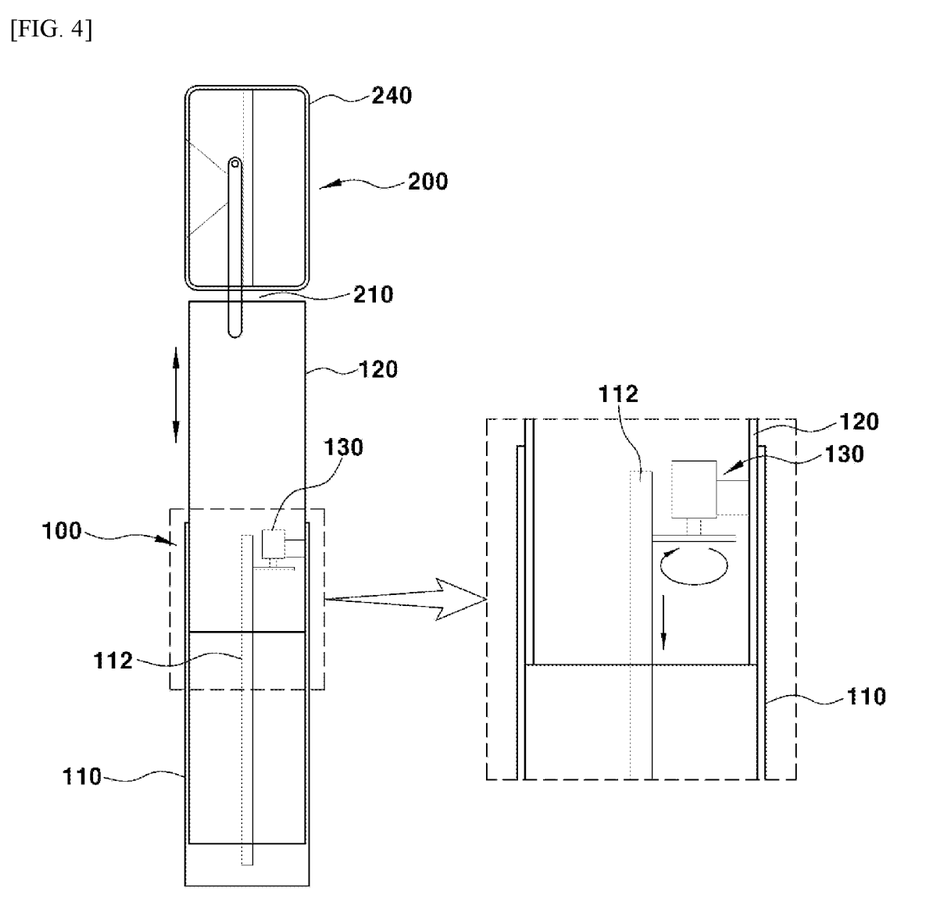
FIG. 4 is a view showing an operation of the lift unit of the sterilization apparatus for a vehicle according to an exemplary embodiment of the present disclosure.

Furthermore, FIG. 3 is a view showing a configuration of the lift unit of the sterilization apparatus for a vehicle according to an exemplary embodiment of the present disclosure, and FIG. 4 is a view showing an operation of the lift unit of the sterilization apparatus for a vehicle according to an exemplary embodiment of the present disclosure.

Figure 5:
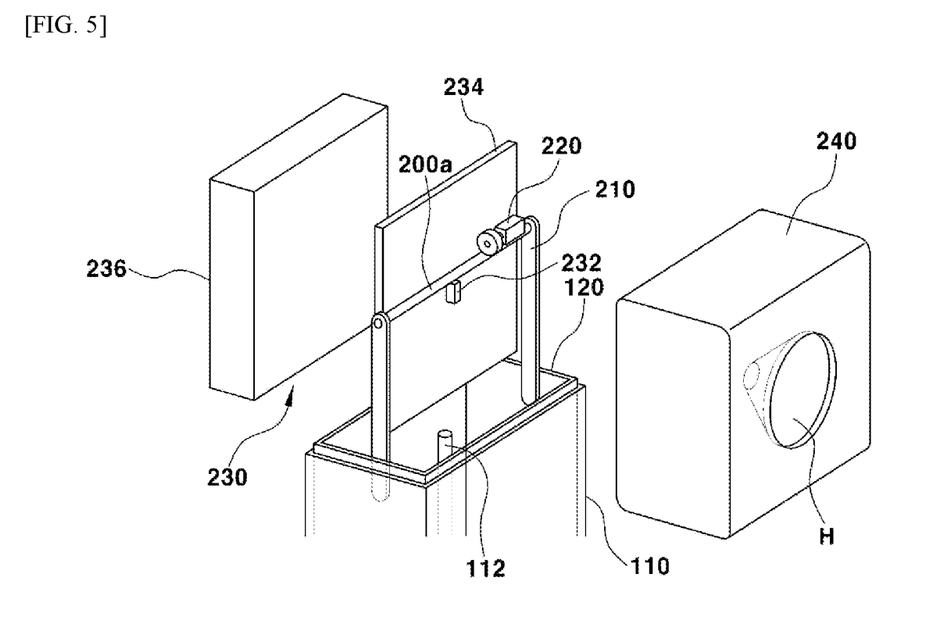
FIG. 5 is a view showing a configuration of the sterilization unit of the sterilization apparatus for a vehicle according to an exemplary embodiment of the present disclosure.
Figure 6:
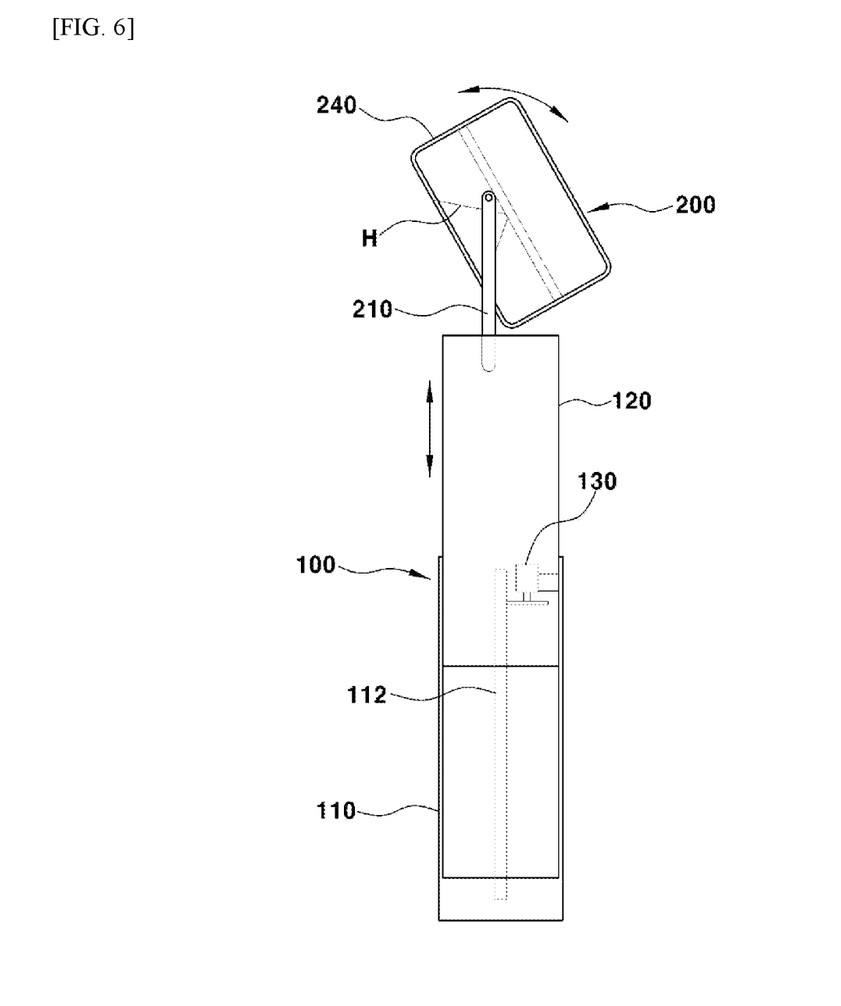
FIG. 6 is a view showing an operation of the sterilization unit of the sterilization apparatus for a vehicle according to an exemplary embodiment of the present disclosure.

Furthermore, FIG. 5 is a view showing a configuration of the sterilization unit of the sterilization apparatus for a vehicle according to an exemplary embodiment of the present disclosure, and FIG. 6 is a view showing an operation of the sterilization unit of the sterilization apparatus for a vehicle according to an exemplary embodiment of the present disclosure.

Figure 7A:
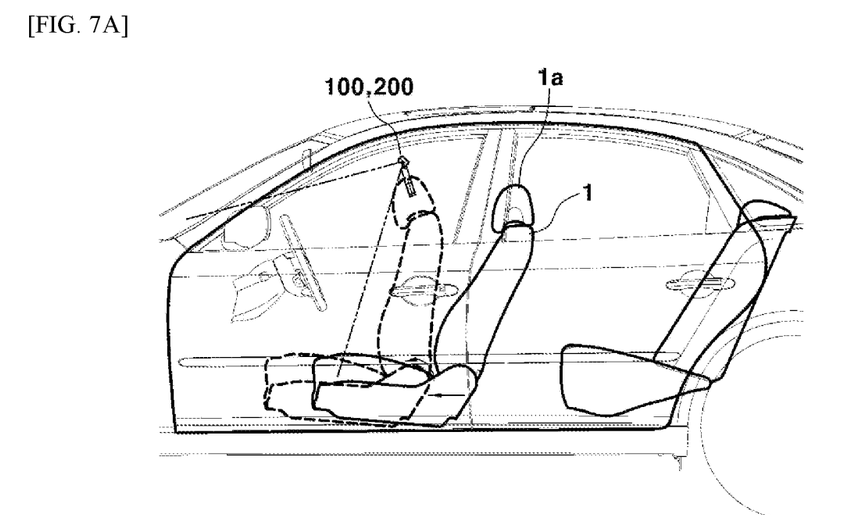
FIG. 7A and FIG. 7B are views each showing a first example of a surface sterilization mode performed by the sterilization apparatus for a vehicle according to an exemplary embodiment of the present disclosure.
Figure 7B:
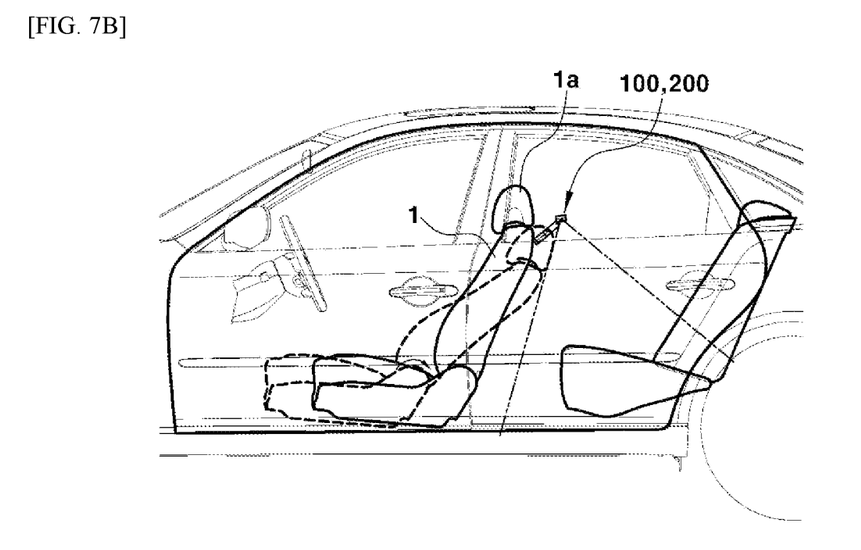
Figure 8A:
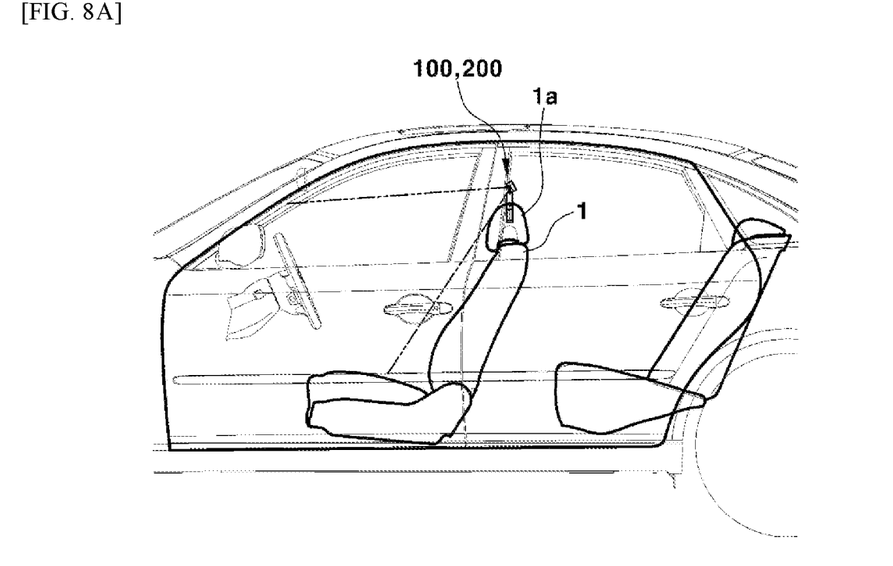
FIG. 8A and FIG. 8B are views each showing a second example of the surface sterilization mode performed by the sterilization apparatus for a vehicle according to an exemplary embodiment of the present disclosure.
Figure 8B:
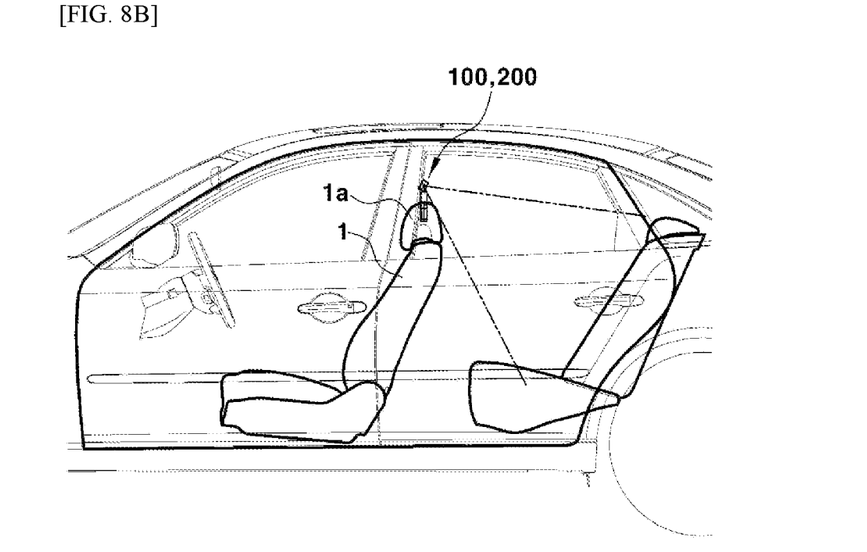

Furthermore, FIG. 7A and FIG. 7B are views each showing a first example according to an exemplary embodiment of the present disclosure, i.e., a surface sterilization mode performed by the sterilization apparatus for a vehicle, and FIG. 8A and FIG. 8B are views each showing a second example of the surface sterilization mode performed by the sterilization apparatus for a vehicle according to an exemplary embodiment of the present disclosure.

Figure 9:
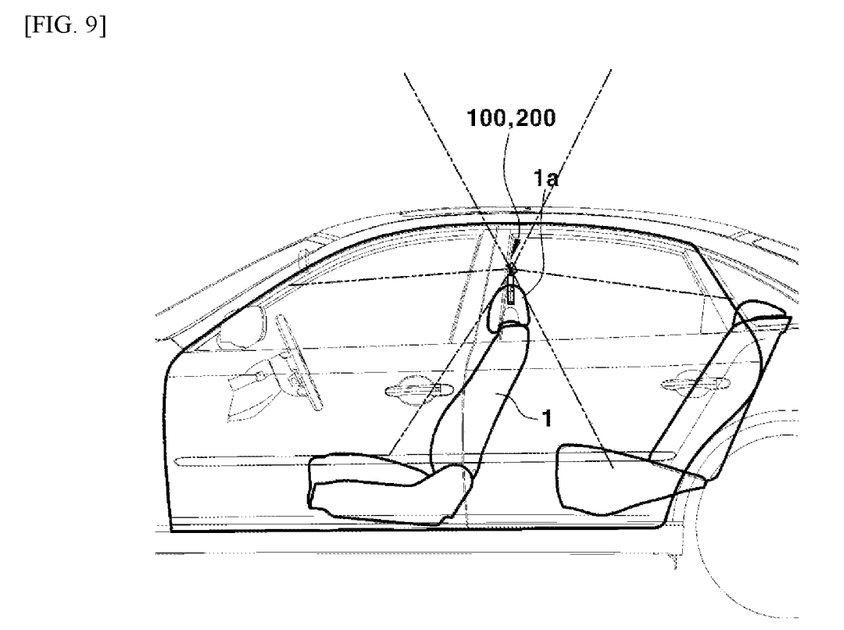
FIG. 9 is a view showing an air sterilization mode performed by the sterilization apparatus for a vehicle according to an exemplary embodiment of the present disclosure.
Figure 10:
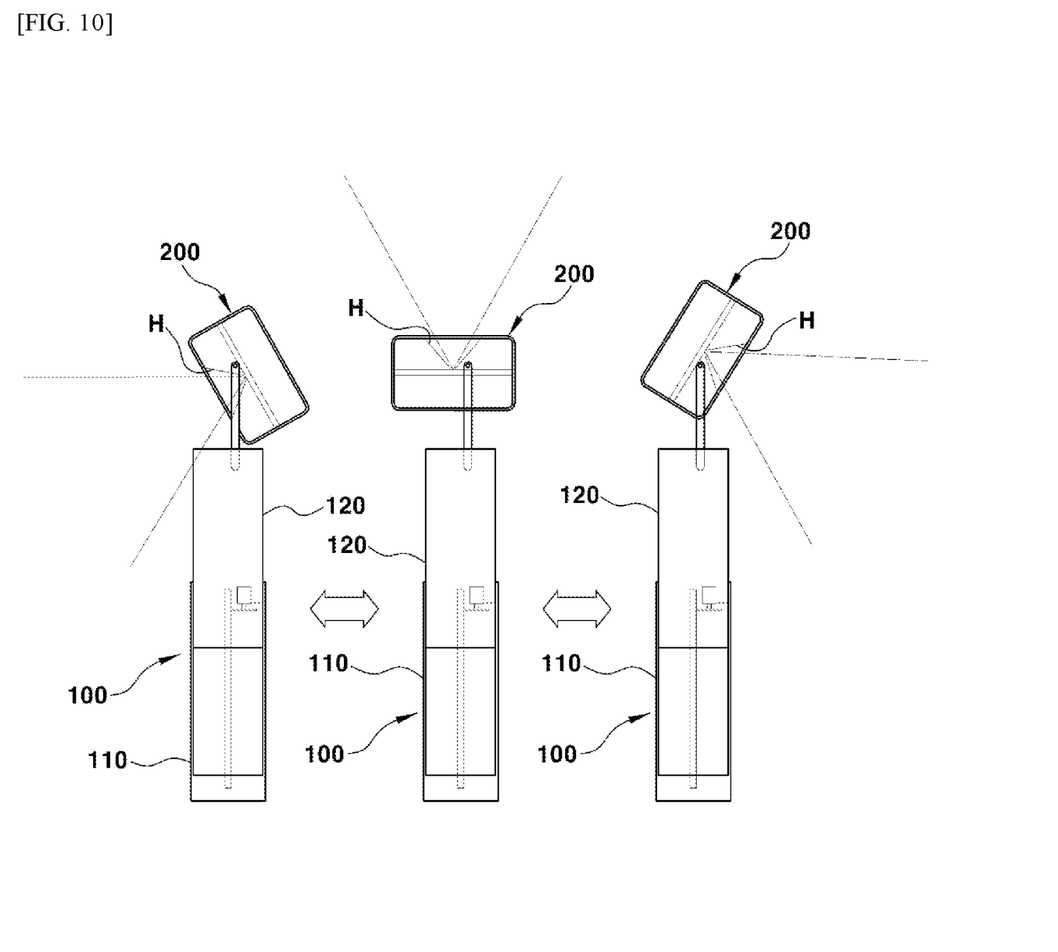
FIG. 10 is a view showing an operating state of the air sterilization mode performed by the sterilization apparatus for a vehicle according to an exemplary embodiment of the present disclosure.

Furthermore, FIG. 9 is a view showing an air sterilization mode performed by the sterilization apparatus for a vehicle according to an exemplary embodiment of the present disclosure, and FIG. 10 is a view showing an operating state of the air sterilization mode performed by the sterilization apparatus for a vehicle according to an exemplary embodiment of the present disclosure.

As shown in FIG. 1 and FIG. 2, the sterilization apparatus for a vehicle according to various exemplary embodiments of the present disclosure may include a lift unit 100, a sterilization unit 200 and a control unit 300.

The lift unit 100 may be mounted in a headrest 1a included in a seat 1, and selectively lifted to protrude.

In more detail, the lift unit 100 may be mounted while being inserted into a mounting area "A" positioned in an upper portion of the headrest 1a of the seat 1 disposed in a first row in the vehicle (see FIG. 1), and may be selectively lifted as a preset operation condition is satisfied.

To the present end, the lift unit 100 may include a case 110, a lift block 120 and a driving member 130, as shown in FIG. 3.

The case 110 may have a rectangular enclosure shape to correspond to an internal shape of the mounting area "A."

The case 110 may be fixed to an internal center portion of the mounting area "A," and include a lift guide 112 including a predetermined length and formed upright therein.

Furthermore, the lift block 120 may be inserted into the case 110, and selectively lifted from the inside of the case 110 in a longitudinal direction of the lift guide 112 in a state of being coupled with the lift guide 112 positioned therein through the driving member 130 to be described below.

The driving member 130 may be mesh-connected to the lift guide 112 in a state of being mounted on the lift block 120, and thus transmit a driving force for the lift block 120 to be lifted from the inside of the case 110 when driven, as shown in FIG. 4.

The driving member 130 may preferably be a spindle motor and coupled to the lift guide 112 which is a spindle, and rotated in the longitudinal direction of the lift guide 112 when driven, so that the lift block 120 is selectively lifted from the inside of the case 110.

A structure where the driving member 130 is the spindle motor and the lift guide 112 is the spindle may be only any one exemplary embodiment in which the lift block 120 is selectively lifted from the inside of the case 110, the present disclosure is not limited thereto, and may thus use any other structure in which the lift is possible.

Furthermore, the present disclosure limits that the lift unit 100 including the case 110, the lift block 120 and the driving member 130, is mounted on the upper portion of the headrest 1a of the seat 1 disposed in the first row in the vehicle. However, for a vehicle including three rows, the lift unit may also be mounted in the headrest 1a of the seat 1 disposed in the first and second rows, and also be mounted in an armrest in the vehicle in addition thereto.

Meanwhile, as shown in FIG. 2, the sterilization unit 200 may be connected to the lift unit 100, include an ultra violet light emitting diode (UV LED) 232, and be rotated along a rotation axis 200a to be adjusted to have an angle for performing sterilization.

To the present end, the sterilization unit 200 may include connection members 210, a motor 220, a sterilization module 230 and a cover member 240, as shown in FIG. 5.

The pair of connection members 210 may be disposed upright and connected to the lift block 120 included in the lift unit 100.

The motor 220 may be positioned on a rotation shaft 200a connecting the pair of connection members 210, spaced from each other, to each other in a horizontal direction, and may transmit a driving force for the rotation shaft 200a to be rotated in a forward or reverse direction as shown in FIG. 6.

The sterilization module 230 may be coupled to the rotation shaft 200a, and include a printed circuit board (PCB) 234 mounting a plurality of electrical devices for making the UV LED 232 light up thereon, a heat sink 236 mounted on the rear of the PCB 234 and dissipating heat generated from the UV LED 232 and the like therein, together with the UV LED 232 for sterilization.

In a state where the sterilization module 230 is positioned to be spaced from the upper portion of the lift unit 100, when the motor 220 is driven, the rotation shaft 200a may be rotated in the forward or backward direction, and an angle of the cover member 240 may be adjusted toward the front or rear side of the vehicle interior based on the first row of the seat 1.

The cover member 240 may be a housing for mounting the plurality of components as described above therein, may be rotated with the accommodated sterilization module 230 by having the rotation shaft 200a passing through an inside thereof, and may include an irradiation hole "H" in which the UV LED 232 is intensively irradiated.

Meanwhile, as shown in FIG. 1, the control unit 300 may be connected to a seat control unit controlling the position and angle of the seat 1 to be adjusted together with the lift unit 100 and the sterilization unit 200, and control the lift unit 100 and the sterilization unit 200 to be lifted and adjusted to have the angle for performing the sterilization when all of the preset operation conditions are satisfied.

The plurality of operation conditions may be preset to conditions in which a vehicle ignition is OFF, a vehicle door is locked, and no seat-occupation signal is received from a detection sensor 10 positioned in the seat 1.

The following operation process of the control unit 300 is sequentially described with reference to FIGS. 7A to 10 based on the plurality of operation conditions as described above.

When all of the above-described operation conditions are satisfied, in a state where an angle of the seat 1 in the first row is rotated forward from an initial position, the control unit 300 may control a sterilization angle of the sterilization unit 200 to be adjusted to face a front side of the vehicle interior (see FIG. 7A), may control a tilt angle of the seat 1 to be rotated from the initial position to the rear side and control the sterilization angle of the sterilization unit 200 to be adjusted to face a rear surface of the seat 1 in the first row (see FIG. 7B) when determining that sterilization time elapses more than preset time.

In other words, when the vehicle ignition is OFF, the control unit 300 may allow the vehicle door to be repeatedly switched to be opened and closed, and then determine whether there is a passenger occupying the seat through the detection sensor 10 positioned in each seat 1 in the first and second rows.

When receiving a signal notifying that there is no passenger from the detection sensor 10, the control unit 300 may allow a position of the seat 1 to be slide-moved to the front side as far as possible, and then allow the tilt angle of the seat 1 to be rotated as shown in FIG. 7A.

Here, in the state where the angle of the seat 1 is rotated, the control unit 300 may control the lift unit 100 to make the sterilization unit 200 externally protrude from the headrest 1a, simultaneously control an operation of the sterilization unit so that a sterilization direction of the sterilization unit 200 faces a front surface of the seat 1 to allow the UV LED 232 for sterilization to be turned on for the preset time, facilitating effective sterilization of various equipment positioned in the front side of the vehicle including a steering wheel and a center fascia.

Furthermore, as shown in FIG. 7B, in a state where the tilt angle is rotated repeatedly, the control unit 300 may then control the operation of the sterilization unit 200 so that the sterilization direction of the sterilization unit 200 also faces the rear surface of the seat 1 to allow the UV LED 232 for sterilization to be turned on for the set time, facilitating effective sterilization of the rear surface of the seat 1.

The reason is as follows. The sterilization may be stably performed when the UV LED 232 is irradiated by the sterilization unit 200 in a straight direction thereof. However, sterilization performance may be relatively reduced in a portion where the UV LED 232 is irradiated in an oblique direction thereof. Furthermore, a longer sterilization distance may inevitably cause the reduced sterilization performance. Therefore, to have a maximized improvement of the sterilization performance, when performing the sterilization, the position of the seat 1 may be slide-moved forward as much as possible, and the UV LED 232 may then be irradiated on the various equipment required to be sterilized, in the straight direction by also adjusting the tilt angle.

As described above, after slide-moving the position of the seat 1 to the front side, performing the sterilization for the set time, and finishing the sterilization, the position of the seat 1 may be again slide-moved to the rear side as much as possible, and the tilt angle of the seat 1 and the angle of the sterilization unit 200 may be repeatedly adjusted for the set time in the same manner as the control described above so that sterilization is performed.

In the present manner, when the sterilization on the front or rear side of the vehicle interior is completed by lighting up each UV LED 232 and changing the sterilization direction, the control for the sterilization may be finished by rotating the position and tilt angle of the seat 1 back to the initial position.

Furthermore, although not shown in the drawings, when all of the above-described operation conditions are satisfied, in a state where the angle of the seat 1 in the first row is fixed to the initial position, the control unit 300 may allow the sterilization to be performed by controlling the sterilization angle of the sterilization unit 200 to be adjusted to face the front or rear surface of the vehicle interior. Furthermore, in the state where the seat 1 in the first row is moved forward from the initial position, or moved backward from the initial position, the control unit 300 may allow the sterilization to be performed by allowing the sterilization angle of the sterilization unit 200 to be adjusted to face the front or rear surface of the vehicle interior. Accordingly, the control unit may control an operation of the sterilization apparatus by use of variously set surface sterilization modes.

As described above, to drive the surface sterilization mode for the sterilization of various equipment of the vehicle interior, when the is configured to control using the control unit 300 are sequentially performed, a signal notifying that all of the plurality of operation conditions are satisfied may be transmitted to a user terminal, and the user may directly control the surface sterilization mode to be driven using the user terminal.

Furthermore, in addition to a manual driving control made by operation of the user terminal as described above, when all of the plurality of operation conditions are satisfied, the control unit 300 may control the seat 1, the lift unit 100 and the sterilization unit 200 to be automatically driven in the surface sterilization mode.

Accordingly, the driving control in the surface sterilization mode may only be any one control for the sterilization, the present disclosure is not limited thereto, and may omit a plurality of processes to simplify the control for the sterilization.

In more detail, when the processes of slide-moving the seat 1 and rotating the tilt angle thereof are omitted and all of the plurality of operation conditions are satisfied, the control unit 300 may control the operations of the lift unit 100 and the sterilization unit 200 on the current position and tilt angle of the seat 1, i.e., may control the lift unit 100 to be lifted to protrude, and control the angle of the sterilization unit 200 to be adjusted to face the front or rear surface of the vehicle interior, as shown in FIGS. 8A and 8B, facilitating the effective sterilization of the vehicle interior with only minimal controls for the sterilization.

As shown in FIG. 9, in addition to the surface sterilization mode, the control unit 300 may control the operations of the lift unit 100 and the sterilization unit 200 so that an operation of the sterilization apparatus in the air sterilization mode are performed.

In other words, the control unit 300 may control the operations of the lift unit 100 and the sterilization unit 200 to sterilize air of the vehicle interior in addition to the sterilization of various equipment of the vehicle interior. In the instant case, the control unit may allow the angle of the UV LED 232 repeatedly lit up in left and right and upper directions to be adjusted.

That is, as in the surface sterilization mode described above, when the preset operation conditions are satisfied, in more detail, the vehicle ignition is OFF, the vehicle door is repeatedly switched to be opened and closed, it is then determined whether there is a passenger occupying the seat through the detection sensor 10 positioned in each seat 1 in the first and second rows, and the signal notifying that there is no passenger is transmitted to the control unit 300, as shown in FIG. 10, the control unit may control the lift unit 100 to be lifted, and allow the angle of the sterilization unit 200 to be repeatedly adjusted for the sterilization unit to sequentially face the left, upper, and right directions in that state, allowing the operation of the sterilization apparatus to be performed in the air sterilization mode by use of the UV LED 232.

Similarly, to drive the air sterilization mode, when the controls using the control unit 300 are sequentially performed, the signal notifying that all of the plurality of operation conditions are satisfied may be transmitted to the user terminal, and the user may directly control the air sterilization mode to be driven using the user terminal. When the plurality of operation conditions are satisfied, the control unit may control the lift unit 100 and the sterilization unit 200 to be driven automatically based on the air sterilization mode.

As a result, in the present exemplary embodiment of the present disclosure, it is possible to effectively sterilize various equipment such as the steering wheel, the center fascia, the rear seat and the like by controlling all of the position and tilt angle of the seat 1, the lift unit 100 and the sterilization unit 200 in the surface sterilization mode, and similarly to sterilize air of the vehicle interior by controlling the lift unit 100 and the sterilization unit 200 in the air sterilization mode. Therefore, it is possible to selectively sterilize various equipment of the vehicle interior or air of the vehicle interior according to a purpose, achieving the effective sterilization according to the purpose.

As set forth above, according to various exemplary embodiments of the present disclosure, the sterilization apparatus for a vehicle may sterilize the entire vehicle interior, while focusing on a portion in contact with a passenger's hand, such as the steering wheel, center fascia, seat or the like by determining whether the passenger is accommodated from the seat sensor configured for detecting whether the vehicle seat is occupied when the sterilization is requested by the user, and then selectively adjusting the angle of the UV LED module by its lift and rotation for performing the sterilization, while the UV LED module is applied to the headrest of the seat.

Furthermore, according to various exemplary embodiments of the present disclosure, the sterilization apparatus for a vehicle may have the maximized sterilization performance by use of the fewest ultra violet light emitting diode (UV LED) modules because the sterilization range of each UV LED module may be expanded by its elevation, rotation and adjusted angle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sterilization apparatus for a vehicle, the sterilization apparatus comprising:
    a lift unit mounted in the vehicle to be selectively lifted and protruded;
    a sterilization unit connected to the lift unit, including an ultra violet light emitting diode (UV LED), for sterilizing a vehicle interior; and
    a control unit connected to the lift unit and the sterilization unit for controlling lifting of the lift unit when preset operation conditions are satisfied,
    wherein the preset operation conditions are preset to conditions in which the vehicle is turned off, a vehicle door is locked, and no seat-occupation signal is received from a detection sensor positioned in a vehicle seat, and
    wherein the control unit is configured to control an operation of the sterilization apparatus to be performed in a surface sterilization mode in which lifting and sterilization angle of the sterilization unit are adjusted to face a front surface of the vehicle interior in a state where an angle and a position of a vehicle seat are rotated and moved forward, and lifting and sterilization angle of the sterilization unit are adjusted to face a rear surface of the vehicle interior in a state where the angle and the position of the vehicle seat are rotated and moved backward, when the preset operation conditions are satisfied.

2. The sterilization apparatus of claim 1, wherein the lift unit includes:
    a case fixed into the vehicle wherein a lift guide is mounted in the case,
    a lift block slidably inserted inside the case, wherein the lift guide is positioned in the lift block, and configured for being lifted from the inside of the case along the lift guide, and
    a driving member mounted on the lift block and engaged to the lift guide, and transmitting a driving force to the lift block so that the lift block is lifted from the inside of the case by the driving force.

3. The sterilization apparatus of claim 1, wherein the lift unit is mounted in a headrest included in the vehicle seat in the vehicle.

4. The sterilization apparatus of claim 1, wherein the lift unit is mounted in an armrest in the vehicle to be selectively lifted therefrom.

5. The sterilization apparatus of claim 1, wherein the sterilization unit further includes:
    a pair of connection members disposed upright, wherein first end portions of the connection members are connected to the lift unit;
    a motor positioned on a rotation shaft connecting second end portions of the connection members to each other along a horizontal direction, and transmitting a driving force to the rotation shaft so that the rotation shaft rotates; and
    a sterilization module coupled to the rotation shaft, including the UV LED for sterilization and including an angle adjusted by the rotation shaft which is selectively rotated by the motor as the lift unit is lifted.

6. The sterilization apparatus of claim 5, wherein the sterilization module of the sterilization unit further includes a heat sink dissipating heat generated from the UV LED.

7. The sterilization apparatus of claim 5, wherein the sterilization unit further includes a cover member rotated with the sterilization module by the rotation shaft passing through an inside thereof, including an irradiation hole in which the UV LED is intensively irradiated, and including a housing area for accommodating the motor and the sterilization module therein.

8. The sterilization apparatus of claim 5, wherein the control unit is configured to control an operation of the sterilization apparatus to be performed in an air sterilization mode in which a sterilization angle of the sterilization module is repeatedly adjusted to continuously face front, upper or rear side of the vehicle interior when the preset operation conditions are satisfied.

9. The sterilization apparatus of claim 1, wherein the control unit is configured to control an operation of the sterilization apparatus to be performed in the surface sterilization mode in which the sterilization angle of the sterilization unit is adjusted to face a front side or a rear side of the vehicle interior in a state where a position of the vehicle seat is fixed when the preset operation conditions are satisfied.

10. The sterilization apparatus of claim 1, wherein the control unit is configured to control an operation of the sterilization apparatus to be performed in the surface sterilization mode in which the lifting and sterilization angle of the sterilization unit are adjusted to face front or rear surface of the vehicle interior in a state where the vehicle seat is moved forward when the preset operation conditions are satisfied.

11. The sterilization apparatus of claim 1, wherein the control unit is configured to control an operation of the sterilization apparatus to be performed in the surface sterilization mode in which the lifting and sterilization angle of the sterilization unit are adjusted to face front or rear surface of the vehicle interior in a state where the vehicle seat is moved backward when the preset operation conditions are satisfied.

12. The sterilization apparatus of claim 9, wherein the control unit is configured to control the operation of the sterilization apparatus to be performed in the surface sterilization mode by a request received by the control unit through a user terminal when the preset operation conditions are satisfied.

13. The sterilization apparatus of claim 9, wherein the control unit is configured to control the operation of the sterilization apparatus to be automatically performed in the surface sterilization mode when the preset operation conditions are satisfied.

\* \* \* \* \*